United States Patent
Okubo

(10) Patent No.: US 6,958,686 B2
(45) Date of Patent: Oct. 25, 2005

(54) TRANSMITTER FOR TIRE CONDITION MONITORING APPARATUS AND TIRE CONDITION MONITORING APPARATUS

(75) Inventor: Youichi Okubo, Gifu-ken (JP)

(73) Assignee: Pacific Industrial Co., Ltd., Ogaki (JP)

( * ) Notice: Subject to any disclaimer, the term of this patent is extended or adjusted under 35 U.S.C. 154(b) by 148 days.

(21) Appl. No.: 10/715,997

(22) Filed: Nov. 18, 2003

(65) Prior Publication Data

US 2004/0164855 A1    Aug. 26, 2004

(30) Foreign Application Priority Data

Feb. 26, 2003  (JP) ............................... 2003-049264

(51) Int. Cl.[7] ............................................. B60C 23/00
(52) U.S. Cl. ..................... 340/447; 340/442; 73/146
(58) Field of Search ............................ 340/447, 442, 340/445, 539.1, 671, 672; 116/34 R, 34 A; 73/146, 146.5

(56) References Cited

U.S. PATENT DOCUMENTS

| | | | |
|---|---|---|---|
| 5,656,993 A | 8/1997 | Coulthard | |
| 6,218,937 B1 | 4/2001 | Delaporte | |
| 6,591,671 B2 * | 7/2003 | Brown | 73/146.5 |
| 6,604,416 B2 * | 8/2003 | Tsujita | 73/146.5 |
| 6,861,950 B2 * | 3/2005 | Katou | 340/447 |
| 6,885,296 B2 * | 4/2005 | Hardman et al. | 340/505 |
| 2002/0044050 A1 | 4/2002 | Derbyshire et al. | |
| 2003/0008692 A1 | 1/2003 | Phelan | |

FOREIGN PATENT DOCUMENTS

| | | |
|---|---|---|
| EP | 03 02 6933 | 5/2004 |
| FR | 2814809 A | 4/2002 |
| GB | 2344232 A | 5/2000 |
| JP | 2001-56263 | 2/2001 |

* cited by examiner

Primary Examiner—Toan N. Pham
(74) Attorney, Agent, or Firm—Colin P. Cahoon; Carstens & Cahoon, LLP

(57) ABSTRACT

A transmission controller for a transmitter compares the value of data of the temperature in a tire measured by a temperature sensor with a predetermined threshold temperature, and determines the number of times a transmitting circuit performs the transmitting operation in a cycle of a predetermined length of time. For example, when the temperature in the tire rises, the number of times the transmitting circuit performs the transmitting operation in the predetermined cycle is increased. Therefore, the reduction in the reception probability of a receiver is limited even when the transmission output of the transmitter is reduced due to temperature affect.

18 Claims, 3 Drawing Sheets

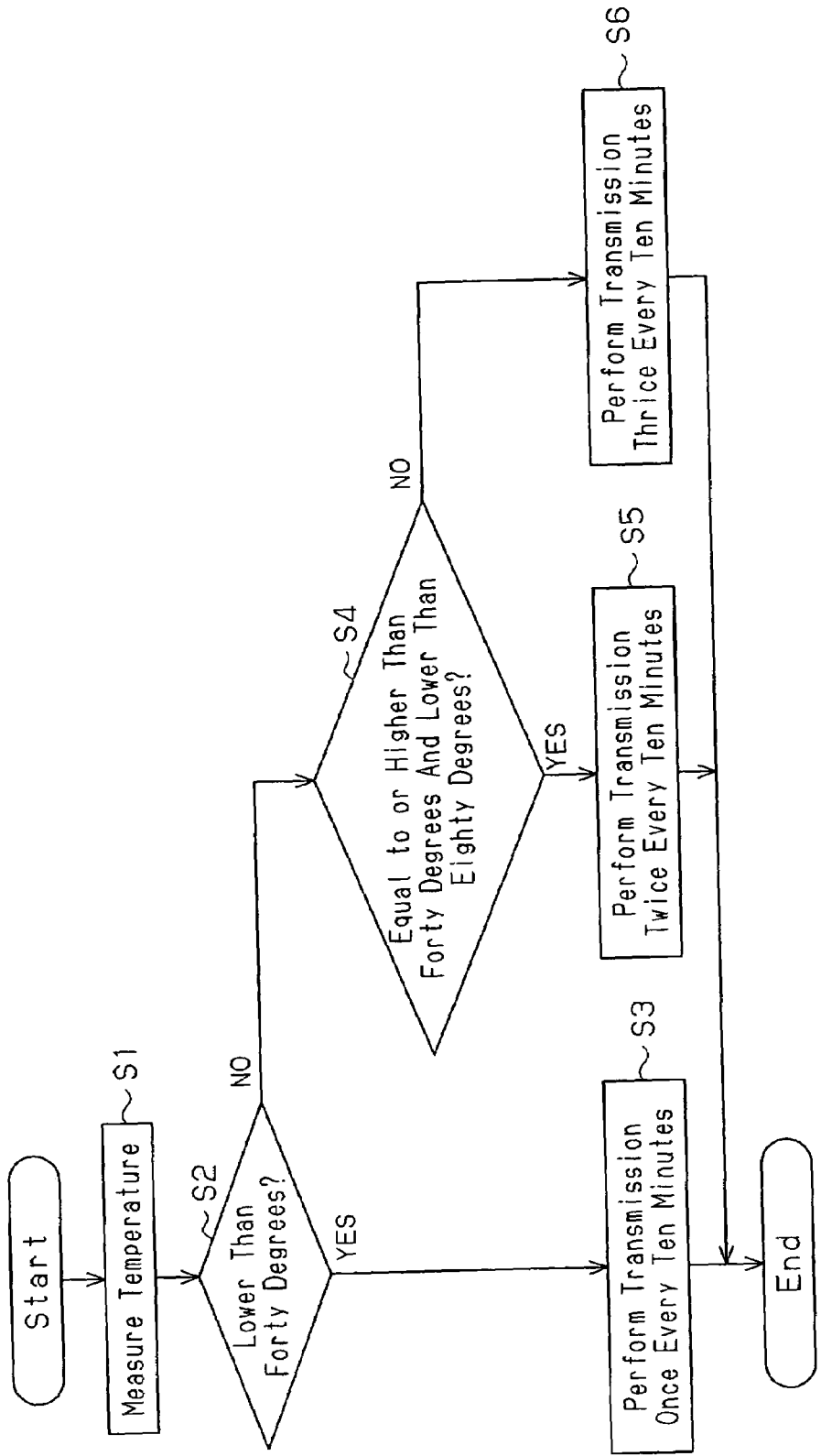

TRANSMITTER FOR TIRE CONDITION MONITORING APPARATUS AND TIRE CONDITION MONITORING APPARATUS

BACKGROUND OF THE INVENTION

The present invention relates to a wireless-type tire condition monitoring apparatus and a transmitter for the tire condition monitoring apparatus which enable checking of tire conditions, including the air pressure in a tire, from the interior of a vehicle.

Japanese Laid-Open Patent Publication No. 2001-56263 discloses a wireless-type tire condition monitoring apparatus for checking the conditions of a plurality of tires mounted on a vehicle from the interior of the vehicle. The monitoring apparatus has a plurality of transmitters respectively attached to the tires, a receiver mounted on the body of the vehicle, and a display device for informing the driver of the vehicle of the air pressure conditions of the tires. Each transmitter measures tire conditions, including the internal air pressure and the internal temperature of the corresponding tire, and transmits data indicating the measured tire conditions to an electric wave receiving device. The receiver has a plurality of receiving antennas, a synthesizer and the receiving device. The synthesizer selectively outputs to the electric wave receiving device the maximum voltages induced in each receiving antenna. Consequently, the receiver can stably receive a signal transmitted from each transmitter.

In general, the temperature in tires changes under the influence of outside air temperature, direct rays of the sun, heat generated by traveling, etc. The performance of the transmitter constituted by semiconductor electronic components depends on temperature. More specifically, the transmission power of the transmitter decreases as the internal tire temperature rises.

The transmitter rotates together with the tire when the vehicle travels. Depending on the position of the transmitter at the time of transmission, there is a possibility of the receiver being unable to receive data from the transmitter. When the transmission output of the transmitter is reduced, the reception probability, i.e., the probability of data being received by the receiver, is also reduced. According to an experiment, the intensity of the electric field at the receiving antenna decreases by 1 dB$\mu$V/m each increase of the internal tire temperature by forty degrees Centigrade.

SUMMARY OF THE INVENTION

An object of the present invention is to provide a transmitter for a tire condition monitoring apparatus and a tire condition monitoring apparatus designed by considering temperature dependence.

To achieve the above-described object, the present invention provides a transmitter for a tire condition monitoring apparatus located in the tire of a vehicle. The transmitter includes a measurement device, a transmission device and a transmission controller. The measurement device measures the condition of the tire. The measured condition of the tire includes an internal temperature of the tire. The transmission device performs wireless communication of data indicating the condition of the tire measured by the measurement device. The transmission controller controls the transmission device in accordance with an operating mode selected from a normal mode, in which data transmission is performed a predetermined number of times in a cycle of a predetermined length of time, and a temperature compensation mode, in which data transmission is performed a number of times greater than the predetermined number of times in the same cycle. The transmission controller determines whether to shift from the current one of the operating modes to the other operating mode by comparing the measured internal temperature of the tire with a predetermined threshold temperature.

The present invention provides another transmitter for a tire condition monitoring apparatus located in the tire of a vehicle. The transmitter includes a measurement device, a transmission device and a transmission controller. The measurement device measures the condition of the tire. The measured condition of the tire includes an internal temperature of the tire. The transmission device performs wireless communication of data indicating the condition of the tire measured by the measurement device. The transmission controller controls the transmission device in accordance with an operating mode selected from a normal mode in which data transmission is performed at first time intervals and a temperature compensation mode in which data transmission is performed at second time intervals shorter than the first time intervals. The transmission controller determines whether to shift from the current one of the operating modes to the other operating mode by comparing the measured internal temperature of the tire with a predetermined threshold temperature.

The present invention also provides a tire condition monitoring apparatus located in a tire of a vehicle. The tire condition monitoring apparatus has a transmitter and a receiver. The receiver receives data transmitted from the transmitter and which processes the received data. The transmitter includes a measurement device, a transmission device and a transmission controller. The measurement device measures the condition of the tire. The measured condition of the tire includes an internal temperature of the tire. The transmission device performs wireless communication of data indicating the condition of the tire measured by the measurement device. The transmission controller controls the transmission device in accordance with an operating mode selected from a normal mode, in which data transmission is performed a predetermined number of times in a cycle of a predetermined length of time, and a temperature compensation mode, in which data transmission is performed a number of times greater than the predetermined number of times in the same cycle. The transmission controller selects the operating mode by comparing the measured internal temperature of the tire with a predetermined threshold temperature.

The present invention provides another tire condition monitoring apparatus located in a tire of a vehicle. The tire condition monitoring apparatus has a transmitter and a receiver. The receiver receives data transmitted from the transmitter and which processes the received data. The transmitter includes a measurement device, a transmission device and a transmission controller. The measurement device measures the condition of the tire. The measured condition of the tire includes an internal temperature of the tire. The transmission device performs wireless communication of data indicating the condition of the tire measured by the measurement device. The transmission controller controls the transmission device in accordance with an operating mode selected from a normal mode in which data transmission is performed at first time intervals and a temperature compensation mode in which data transmission is performed at second time intervals shorter than the first time intervals. The transmission controller selects the operating mode by comparing the measured internal temperature of the tire with a predetermined threshold temperature.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5 is a flowchart showing the transmitting operation of the transmitting circuit based on data on temperature measured by a temperature sensor.

DETAILED DESCRIPTION OF THE PREFERRED EMBODIMENTS

An embodiment of the present invention in which the present invention is implemented will be described with reference to FIGS. 1 to 5.

Figure 1:
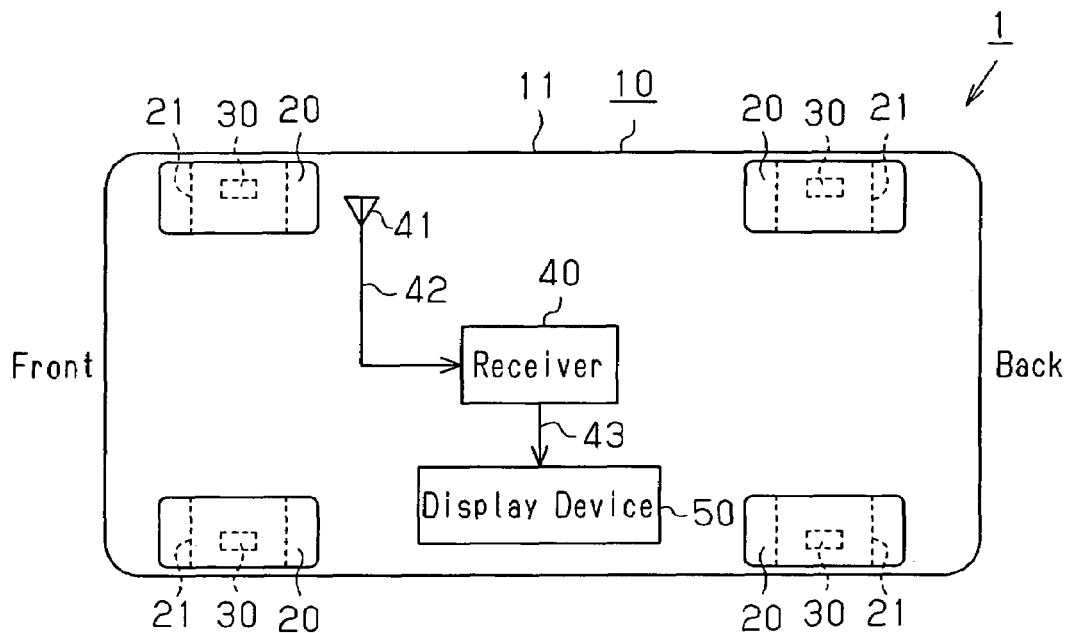
FIG. 1 is a block diagram showing a tire condition monitoring apparatus in an embodiment of the present invention.

As shown in FIG. 1, a tire condition monitoring apparatus 1 has transmitters 30 respectively provided on four tires 20 of a vehicle 10, and one receiver 40 provided on the vehicle body 11 of the vehicle 10.

Each transmitter 30 is fixed on a wheel 21 while being positioned inside the corresponding tire 20. Each transmitter 30 measures the conditions of the corresponding tire 20, i.e., the air pressure and temperature in the corresponding tire 20, to obtain data including air pressure data and temperature data, and transmits the data to the receiver 40 by wireless communication.

The receiver 40 is mounted in a predetermined place on the vehicle body 11 and operates, for example, by power from a battery (not shown) of the vehicle 10. The receiver 40 has one receiving antenna 41, which is connected to the receiver 40 by a cable 42. The receiver 40 receives through the receiving antenna 41 a signal transmitted from each transmitter 30.

A display device 50 is placed in such an area as to be visible from the driver of the vehicle 10, for example, in the interior of the vehicle. The display device 50 is connected to the receiver 40 by a cable 43.

Figure 2:
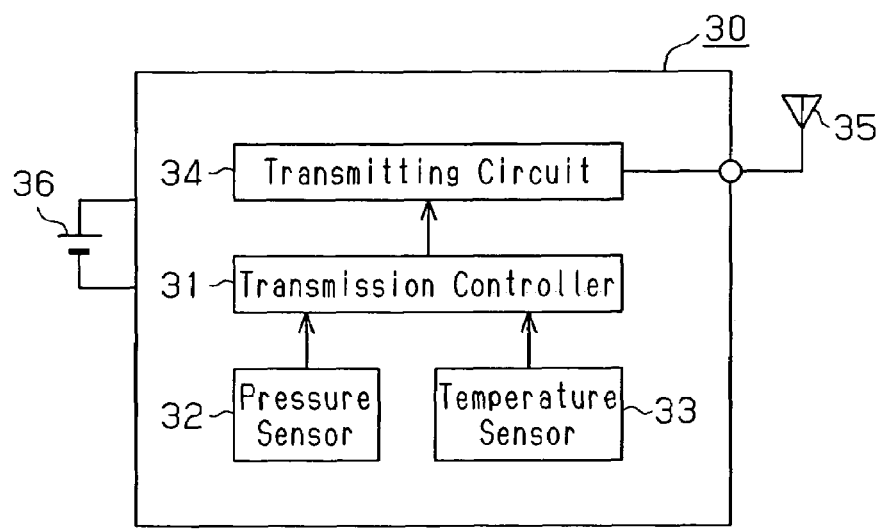
FIG. 2 is a block diagram of a transmitter provided in the monitoring apparatus shown in FIG. 1.

As shown in FIG. 2, each transmitter 30 has a transmission controller 31 constituted by a microcomputer or the like. The transmission controller 31 has, for example, a central processing unit (CPU), a read-only memory (ROM) and a random-access memory (RAM).

In an internal memory, e.g., the ROM of the transmission controller 31, unique ID codes are registered. The ID codes are used for identification of the four transmitters 30.

A pressure sensor 32 measures the air pressure in the tire 20 to obtain air pressure data, and outputs the air pressure data to the transmission controller 31. A temperature sensor 33 measures the temperature in the tire 20 to obtain temperature data, and outputs the temperature data to the transmission controller 31. In this embodiment, each of the pressure sensor 32 and the temperature sensor 33 functions as a measuring device.

The transmission controller 31 outputs to a transmitting circuit 34 the input air pressure data and temperature data and the ID codes registered therein. The transmitting circuit 34 transmits the data including the air pressure data, the temperature data and the ID codes to the receiver 40 by wireless communication through a transmitting antenna 35. The transmitter 30 has a battery 36. The transmitter 30 operates by power from the battery 36.

Figure 3:
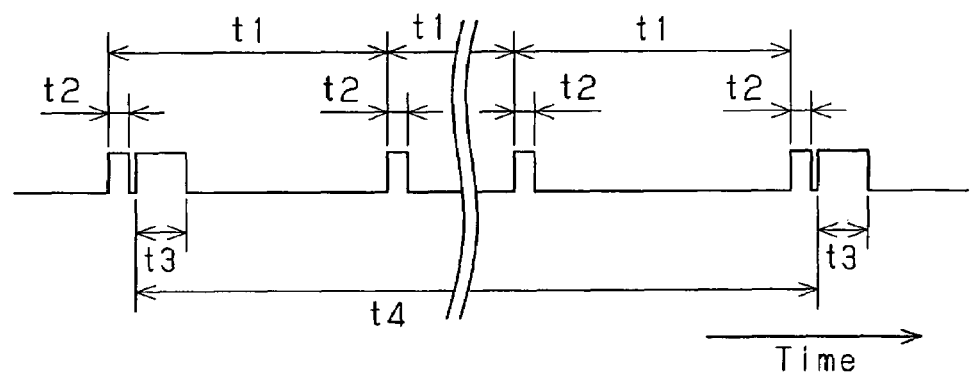
FIG. 3 is a timing chart for explaining the operation of the transmitter.

As shown in FIG. 3, the transmission controller 31 controls the pressure sensor 32 and the temperature sensor 33 to perform measuring operations at measurement time intervals t1 set in advance (at intervals of 15 seconds in this embodiment). A time t2 shown in FIG. 3 is a measuring operation time, i.e., a period of time from the moment at which the pressure sensor 32 and the temperature sensor 33 start measuring to the moment at which processing of data obtained by measuring is completed by the transmission controller 31.

The transmission controller 31 counts the number of measurements made by the pressure sensor 32 and the temperature sensor 33. Each time a predetermined number of measurements (forty measurements in this embodiment) is reached, the transmission controller 31 controls the transmitting circuit 34 to perform the transmitting operation. In this embodiment, the measurement time interval t1 of measurements made by the pressure sensor 32 and the temperature sensor 33 is ordinarily determined to be fifteen seconds. Accordingly, the transmission controller 31 controls the transmitting circuit 34 to perform the transmitting operation at transmission time intervals set in advance, e.g., intervals of ten minutes (15 sec.×40), as shown in FIG. 3. A time t3 shown in FIG. 3 is a transmitting operation time, i.e., a period of time during which the transmitting circuit 34 performs the transmitting operation for transmission to the receiver 40. Therefore, the transmitter 30 is in a sleep state such that substantially no power from the battery 36 is consumed during the time period other than the above-described measuring operation time t2 and the transmitting operation time t3.

The measurement time interval t1 and the transmission time interval t4 are determined, for example, by considering the capacity of the battery 36, the power consumption of the transmitter 30, and the measuring operation time t2 and the transmitting operation time t3 of the transmitter 30. For instance, it has been confirmed that the life of the battery 36 is 10 years or longer in a case where the battery 36 used has a capacity of 1000 mAh, and where the measurement time interval t1 is fifteen seconds and the transmission time interval t4 is ten minutes.

The transmission controller 31 controls the transmitting circuit 34 to perform the transmitting operation at the above-described constant transmission time intervals t4 (first time intervals) (in a normal mode). However, when the transmission controller 31 determines on the basis of temperature data from the temperature sensor 33 that a mode change condition set in advance is satisfied, it effects a transition from the normal mode to a temperature compensation mode. The mode change condition is an increase in temperature in the tire 20.

In a temperature compensation mode, the transmission controller 31 controls the transmitting circuit 34 to perform the transmitting operation at time intervals (second time intervals) shorter than the transmission time interval t4 in the normal mode and equal to or longer than the measurement time interval t1. However, even when a transition to a temperature compensation mode is made, the measurement time interval t1 of measurements made by the pressure sensor 32 and the temperature sensor 33 is not changed.

In this embodiment, the operating mode of the transmitter 30 is changed to a first temperature compensation mode when the value of data of the temperature measured by the temperature sensor 33 is equal to or higher than a predetermined first threshold temperature (e.g., forty degrees C.) and lower than a second threshold temperature (e.g., eighty degrees C.) while the transmitter 30 is operating in the normal mode.

When the value of data of the temperature measured by the temperature sensor 33 becomes equal to or higher than the predetermined second threshold temperature (e.g., eighty degrees C.), the operating mode of the transmitter 30 is changed to a second temperature compensation mode. In this embodiment, when the value of data of the temperature measured by the temperature sensor 33 is lower than the predetermined first threshold temperature (e.g., forty degrees C.), the operating mode of the transmitter 30 is changed to the normal mode.

Thus, the transmitter 30 operates in one of the normal mode, the first temperature compensation mode and the second temperature compensation mode by comparing the value of data of the temperature measured by the temperature sensor 33 with the predetermined threshold temperatures.

Figure 4:
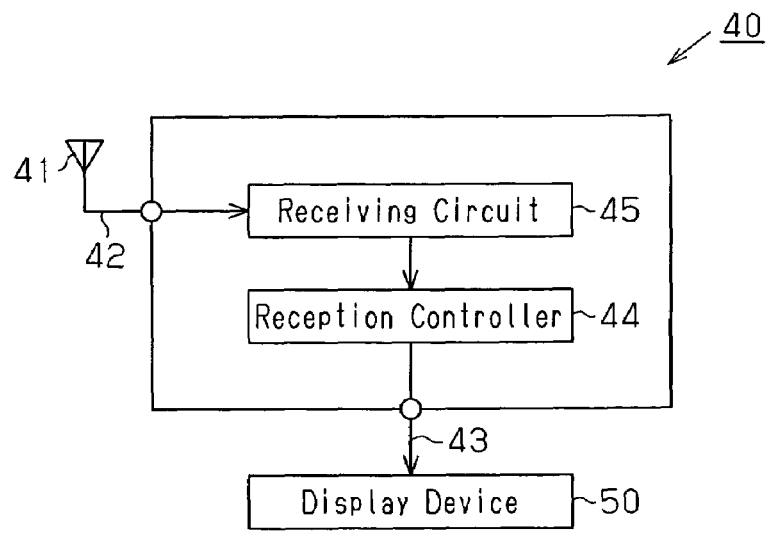
FIG. 4 is a block diagram showing a receiver provided in the monitoring apparatus shown in FIG. 1.

As shown in FIG. 4, the receiver 40 has a receiving circuit 45 and a reception controller 44 for processing data received through the receiving antenna 41. The reception controller 44 constituted by a microcomputer or the like has, for example, a CPU, a ROM and a RAM. The receiving circuit 45 receives data transmitted from each transmitter 30 through the receiving antenna 41. The receiving circuit 45 demodulates and decodes the received data and supplies the demodulated data to the reception controller 44.

The reception controller 44 determines, on the basis of the received data, the air pressure and the temperature in the tire 20 corresponding to the transmitter 30 that has transmitted the data. The reception controller 44 controls the display device 50 to display the data on the air pressure and the temperature. In particular, when an air pressure abnormality occurs in the tire 20, the reception controller 44 controls the display device 50 to display a warning. The receiver 40 starts up, for example, by switching on the key switch (not shown) of the vehicle 10.

The transmitting operation of the transmitting circuit 34 based on data on the temperature measured by the temperature sensor 33 will be described with reference to the flowchart of FIG. 5.

In step S1, the transmission controller 31 controls the temperature sensor 33 to perform the measuring operation at measurement time intervals t1 (intervals of fifteen seconds in this embodiment). The temperature sensor 33 measures the temperature in the tire 20 to obtain data on the temperature and outputs the temperature data to the transmission controller 31. The transmission controller 31 advances the process to step S2.

In step S2, the transmission controller 31 makes a determination as to whether or not the value of data of the temperature in the tire 20 measured by the temperature sensor 33 is lower than the first threshold temperature (e.g., forty degrees C.). If YES in step S2, that is, the value of data on the temperature in the tire 20 is lower than the first threshold temperature (e.g., forty degrees C.), the transmission controller 31 advances the process to step S3. In step S3, the transmission controller 31 controls the transmitting circuit 34 to perform the transmitting operation once every ten minutes (normal mode).

If NO in step S2, that is, the value of data on the temperature in the tire 20 is not lower than the first threshold temperature (e.g., forty degrees C.), the transmission controller 31 advances the process to step S4. In step S4, the transmission controller 31 makes a determination as to whether or not the value of data on the temperature in the tire 20 measured by the temperature sensor 33 is equal to or higher than the first threshold temperature (e.g., forty degrees C.) and lower than the second threshold temperature (e.g., eighty degrees C.). If YES in step S4, that is, the value of data on the temperature in the tire 20 is equal to or higher than the first threshold temperature (e.g., forty degrees C.) and lower than the second threshold temperature (e.g., eighty degrees C.), the transmission controller 31 advances the process to step S5. In step S5, the transmission controller 31 controls the transmitting circuit 34 to perform the transmitting operation twice every ten minutes (at the second time intervals) (first temperature compensation mode), more specifically once every five minutes (=10 min./2).

If NO in step S4, that is, the value of data on the temperature in the tire 20 is not lower than the second threshold temperature (e.g., eighty degrees C.), the transmission controller 31 advances the process to step S6. In step S6, the transmission controller 31 controls the transmitting circuit 34 perform the transmitting operation thrice every ten minutes (at third time intervals) (second temperature compensation mode), more specifically once every 10/3 minutes.

This embodiment has advantages as described below.

The transmission controller 31 compares the value of data on the temperature in the tire 20 measured by the temperature sensor 33 and determines the number of times the transmitting circuit 34 performs the transmitting operation per each ten minute cycle. For example, when the temperature in the tire 20 rises to become equal to or higher than a threshold temperature, the number of times the transmitting circuit 34 performs the transmitting operation per each ten minute cycle is increased. The possibility that the receiver 40 fails to receive data from the transmitter 30, depending on the position of the transmitter 30 at the time of transmission, is thereby reduced. In other words, the reduction in the reception probability of the receiver 40 is limited even when the transmission power of the transmitter 30 is reduced due to an increase in the temperature in the tire 20. Thus, it is possible to provide the transmitter 30 designed by considering the temperature dependence.

The transmission time interval in the first or second temperature compensation mode (in the case of performing transmission once every five minutes or every 10/3 minutes) is shorter than the transmission time interval in the normal mode (in the case of performing transmission once every ten minutes). Also, the transmission time interval in the second temperature compensation mode (in the case of performing transmission once every 10/3 minutes) is shorter than the transmission time interval in the first temperature compensation mode (in the case of performing transmission once every five minutes). Therefore, the possibility of the distance between the transmitter 30 and the receiving antenna 41 being shorter than a predetermined distance is increased and the reduction in the reception probability of the receiver 40 can be limited even when the transmission output of the transmitter 30 is reduced due to an increase in the temperature in the tire 20. Thus, it is possible to provide the transmitter 30 designed by considering the temperature dependence.

The above-described embodiment can also be implemented by being modified as described below.

It should be apparent to those skilled in the art that the present invention may be embodied in many other specific forms without departing from the spirit or scope of the invention. Particularly, it should be understood that the invention may be embodied in the following forms.

The method of controlling the transmitting circuit 34 to perform the transmitting operation twice as often per each ten minute cycle in the first temperature compensation mode may be modified such that the transmitting operation is continuously performed, rather than twice as often per each ten minute cycle. That is, the transmitting operation may be performed all the time rather than being performed twice as often per each ten minute cycle. The same can also be said with respect to the second temperature compensation mode.

When the temperature in the tire 20 measured by the temperature sensor 33 is equal to or higher than a predetermined threshold temperature (e.g., one hundred and twenty degrees C.), data indicating that the temperature in the tire 20 is abnormally high may be transmitted to the receiver 40.

The vehicle in which the apparatus of the present invention is used is not limited to four-wheel vehicles. The above-described embodiment may be applied to two-wheel vehicles, such as bicycles and motor cycles, multi-wheel vehicles, such as buses and trailers, vehicles for industrial use having tires 20 (e.g., forklift trucks), etc.

The present examples and embodiments are to be considered as illustrative and not restrictive and the invention is not to be limited to the details given herein, but may be modified within the scope and equivalence of the appended claims.

What is claimed is:

1. A transmitter for a tire condition monitoring apparatus located in the tire of a vehicle, said transmitter comprising:
   a measurement device for measuring the condition of the tire, wherein the measured condition of the tire includes an internal temperature of the tire;
   a transmission device for performing wireless communication of data indicating the condition of the tire measured by the measurement device; and
   a transmission controller, said transmission controller controls the transmission device in accordance with an operating mode selected from a normal mode, in which data transmission is performed a predetermined number of times in a cycle of a predetermined length of time, and a temperature compensation mode, in which data transmission is performed a number of times greater than said predetermined number of times in the same cycle, and wherein said transmission controller determines whether to shift from the current one of the operating modes to the other operating mode by comparing the measured internal temperature of the tire with a predetermined threshold temperature.

2. The transmitter according to claim 1, wherein said transmission controller selects the normal mode when the measured internal temperature of the tire is lower than the threshold temperature, and said transmission controller selects the temperature compensation mode when the measured internal temperature of the tire is equal to or higher than the threshold temperature.

3. The transmitter according to claim 2, wherein the temperature compensation mode includes a first temperature compensation mode and a second temperature compensation mode in which data transmission is performed a number of times greater than the number of times that data transmission is performed in the first temperature compensation mode.

4. The transmitter according to claim 1, wherein the threshold temperature comprises a first threshold temperature and a second threshold temperature higher than the first threshold temperature, and said transmission controller selects the first temperature compensation mode when the measured internal temperature of the tire is equal to or higher than the first threshold temperature and lower than the second threshold temperature, and selects the second temperature compensation mode when the measured internal temperature of the tire is equal to or higher than the second threshold temperature.

5. A transmitter for a tire condition monitoring apparatus located in the tire of a vehicle, said transmitter comprising:
   a measurement device for measuring the condition of the tire, wherein the measured condition of the tire includes an internal temperature of the tire;
   a transmission device for performing wireless communication of data indicating the condition of the tire measured by the measurement device; and
   a transmission controller, said transmission controller controls the transmission device in accordance with an operating mode selected from a normal mode in which data transmission is performed at first time intervals and a temperature compensation mode in which data transmission is performed at second time intervals shorter than the first time intervals, and wherein said transmission controller determines whether to shift from the current one of the operating modes to the other operating mode by comparing the measured internal temperature of the tire with a predetermined threshold temperature.

6. The transmitter according to claim 5, wherein said transmission controller selects the normal mode when the measured internal temperature of the tire is lower than a predetermined threshold temperature, said transmission controller selects the temperature compensation mode when the measured internal temperature of the tire is equal to or higher than the threshold temperature.

7. The transmitter according to claim 6, wherein the temperature compensation mode includes a first temperature compensation mode and a second temperature compensation mode in which data transmission is performed at third time intervals shorter than the second time intervals in the first temperature compensation mode.

8. The transmitter according to claim 7, wherein the threshold temperature includes a first threshold temperature and a second threshold temperature higher than the first threshold temperature, and said transmission controller selects the first temperature compensation mode when the measured internal temperature of the tire is equal to or higher than the first threshold temperature and lower than the second threshold temperature, and selects the second temperature compensation mode when the measured internal temperature of the tire is equal to or higher than the second threshold temperature.

9. A tire condition monitoring apparatus located in a tire of a vehicle, the tire condition monitoring apparatus comprising:
   a transmitter, the transmitter including:
      a measurement device for measuring the condition of the tire, wherein the measured condition of the tire includes an internal temperature of the tire;

a transmission device performing wireless communication of data indicating the condition of the tire measured by the measurement device; and a transmission controller, said transmission controller controls the transmission device in accordance with an operating mode selected from a normal mode, in which data transmission is performed a predetermined number of times in a cycle of a predetermined length of time, and a temperature compensation mode, in which data transmission is performed a number of times greater than said predetermined number of times in the same cycle, and wherein said transmission controller selects the operating mode by comparing the measured internal temperature of the tire with a predetermined threshold temperature; and a receiver which receives data transmitted from said transmitter and which processes the received data.

10. The tire condition monitoring apparatus according to claim 9, wherein said transmission controller selects the normal mode when the measured internal temperature of the tire is lower than the predetermined threshold temperature, said transmission controller selects the temperature compensation mode when the measured internal temperature of the tire is equal to or higher than the threshold temperature.

11. The tire condition monitoring apparatus according to claim 10, wherein the threshold temperature includes a first threshold temperature and a second threshold temperature higher than the first threshold temperature, and said transmission controller selects the first temperature compensation mode when the measured internal temperature of the tire is equal to or higher than the first threshold temperature and lower than the second threshold temperature, and selects the second temperature compensation mode when the measured internal temperature of the tire is equal to or higher than the second threshold temperature.

12. The tire condition monitoring apparatus according to claim 11, wherein the receiver is connected to a notifying device for providing notification of the condition of the tire.

13. The tire condition monitoring apparatus according to claim 9, wherein the temperature compensation mode comprises a first temperature compensation mode and a second temperature compensation mode in which data transmission is performed a number of times greater than the number of times that data transmission is performed in the first temperature compensation mode.

14. A tire condition monitoring apparatus located in a tire of a vehicle, the tire condition monitoring apparatus comprising:

a transmitter, the transmitter including:

a measurement device for measuring the condition of the tire, wherein the measured condition of the tire includes an internal temperature of the tire;

a transmission device performing wireless communication of data indicating the condition of the tire measured by the measurement device; and a transmission controller, said transmission controller controls the transmission device in accordance with an operating mode selected from a normal mode in which data transmission is performed at first time intervals and a temperature compensation mode in which data transmission is performed at second time intervals shorter than the first time intervals, and wherein said transmission controller selects the operating mode by comparing the measured internal temperature of the tire with a predetermined threshold temperature; and a receiver which receives data transmitted from said transmitter and which processes the received data.

15. The tire condition monitoring apparatus according to claim 14, wherein said transmission controller selects the normal mode when the measured internal temperature of the tire is lower than a predetermined threshold temperature, and selects the temperature compensation mode when the measured internal temperature of the tire is equal to or higher than the threshold temperature.

16. The tire condition monitoring apparatus according to claim 15, wherein the temperature compensation mode includes a first temperature compensation mode and a second temperature compensation mode in which data transmission is performed at third time intervals shorter than the second time intervals.

17. The tire condition monitoring apparatus according to claim 16, wherein the threshold temperature includes a first threshold temperature and a second threshold temperature higher than the first threshold temperature, wherein said transmission controller selects the first temperature compensation mode when the measured internal temperature of the tire is equal to or higher than the first threshold temperature and lower than the second threshold temperature, and selects the second temperature compensation mode when the measured internal temperature of the tire is equal to or higher than the second threshold temperature.

18. The tire condition monitoring apparatus according to claim 14, wherein the receiver is connected to a notifying device for providing notification the condition of the tire.

* * * * *